United States Patent
Kuroiwa et al.

(10) Patent No.: US 9,778,725 B2
(45) Date of Patent: Oct. 3, 2017

(54) SEMICONDUCTOR DEVICE AND ELECTRONIC DEVICE

(71) Applicant: Synaptics Japan GK, Tokyo (JP)

(72) Inventors: Tsuyoshi Kuroiwa, Tokyo (JP); Shigeru Ota, Tokyo (JP)

(73) Assignee: SYNAPTICS JAPAN GK, Tokyo (JP)

( * ) Notice: Subject to any disclaimer, the term of this patent is extended or adjusted under 35 U.S.C. 154(b) by 353 days.

(21) Appl. No.: 14/085,862

(22) Filed: Nov. 21, 2013

(65) Prior Publication Data

US 2014/0145986 A1    May 29, 2014

(30) Foreign Application Priority Data

Nov. 29, 2012    (JP) .................................. 2012-261022

(51) Int. Cl.
*G06F 3/041* (2006.01)
*G06F 1/32* (2006.01)
*G06F 3/044* (2006.01)

(52) U.S. Cl.
CPC .......... *G06F 1/3215* (2013.01); *G06F 1/3262* (2013.01); *G06F 1/3265* (2013.01); *G06F 3/044* (2013.01); *G06F 3/0412* (2013.01); *G06F 3/0416* (2013.01); *Y02B 60/1242* (2013.01)

(58) Field of Classification Search
CPC .... G06F 1/3215; G06F 1/3262; G06F 1/3265; G06F 3/0412; G06F 3/0416; G06F 3/044; Y02B 60/1242
USPC ...................... 345/173–179; 178/18.01–18.09
See application file for complete search history.

(56) References Cited

U.S. PATENT DOCUMENTS

| | | | |
|---|---|---|---|
| 2002/0113781 A1* | 8/2002 | Ishiyama | G09G 3/20 345/204 |
| 2005/0110469 A1* | 5/2005 | Inaba | H02M 3/156 323/222 |
| 2006/0012555 A1* | 1/2006 | Tokumura | G09G 3/3648 345/98 |
| 2007/0046618 A1* | 3/2007 | Imai | G06F 1/3265 345/102 |
| 2007/0257890 A1* | 11/2007 | Hotelling | G06F 3/0418 345/173 |
| 2010/0182261 A1* | 7/2010 | Nose | G06F 3/0416 345/173 |

(Continued)

FOREIGN PATENT DOCUMENTS

| | | | | |
|---|---|---|---|---|
| EP | 2463769 A2 * | 6/2012 | | G06F 3/0418 |
| JP | 2008052584 A * | 3/2008 | | |
| JP | 2011-013996 A | 1/2011 | | |

*Primary Examiner* — Amare Mengistu
*Assistant Examiner* — Stacy Khoo
(74) *Attorney, Agent, or Firm* — Miles & Stockbridge P.C.

(57) ABSTRACT

The semiconductor device has a touch panel controller, a processor, and a display driver. The display driver has a memory circuit which rewritably stores control data for drive control of a display panel from outside the semiconductor device. The processor controls the touch panel controller based on a command provided from outside the semiconductor device, and accesses control data in the memory circuit for controlling internal parts of the semiconductor device. With the aid of the arrangement like this, the processor is allowed to control a touch panel based on the read control data fit to the control by the display driver, and to control, by writing control data, the display panel fit for a control condition of the touch panel.

9 Claims, 3 Drawing Sheets

(56) References Cited

U.S. PATENT DOCUMENTS

| | | | |
|---|---|---|---|
| 2010/0328255 A1* | 12/2010 | Ishizaki | G06F 3/044 345/174 |
| 2011/0003621 A1* | 1/2011 | Atsumi | H04W 52/0254 455/566 |
| 2012/0127109 A1* | 5/2012 | Nishio | G06F 3/04886 345/173 |

* cited by examiner

SEMICONDUCTOR DEVICE AND ELECTRONIC DEVICE

CROSS-REFERENCE TO RELATED APPLICATIONS

The Present application claims priority from Japanese application JP 2012-261022 filed on Nov. 29, 2012, the content of which is hereby incorporated by reference into this application.

BACKGROUND

The present invention relates to a semiconductor device having a touch panel controller operable to control a touch panel and a display driver operable to control a display panel and for example, a technique useful in application to a portable terminal having, as an input device, a touch panel superposed on a display panel.

In a touch panel supporting a multipoint touch according to a mutual capacitance technique, for example, drive electrodes and detection electrodes are arranged to intersect with each other at e.g. right angles with dielectric interposed therebetween; the cross-coupling capacitance of each intersection of the drive and detection electrodes makes a node capacitance. When a capacitance produced by a finger or hand is brought into the vicinity of such a node capacitance, the mutual capacitance of the node decreases by an amount corresponding to a combined capacitance resulting from the approach of the finger or hand. To detect the node capacitance which the change in mutual capacitance has been caused on, the touch panel controller sequentially activates the drive electrodes by use of pulses, integrates, as a signal, a change in voltage developed on each of the detection electrodes capacitively coupling with the drive electrodes, and acquires a signal resulting from the integration for each detection electrode as a signal corresponding to a change in mutual capacitance among the node capacitances arranged so as to form a matrix. A controller which drives a touch panel and detects signals by means of the mutual capacitance technique like this has been already disclosed by e.g. U.S. Patent Application publication No. US2007/0257890A1.

In a portable terminal or the like, a touch panel is arranged over a display panel, which functions as an input device in fact while acquiring data including the correspondence between a display position of a displayed menu and touch coordinate position. As a driver LSI having a display driver operable to perform the drive control of a display panel in addition to a touch panel controller used for drive control of such a touch panel, a driver LSI having a calculation circuit operable to calculate a touch position coordinate from detection signals detected by the touch panel controller has been available.

One example of such driver LSI is described in Japanese Unexamined Patent Publication No. JP-A-2011-13996.

SUMMARY

The inventor has examined a driver LSI having a display driver and a processor operable to calculate a touch position coordinate in addition to a touch panel controller, in which the processor serves as a subprocessor for lightening the control load to a host processor having control of the driver LSI, and it just calculates a coordinate of the position based on signals detected by the touch panel, and controls the touch sensor based on a command from the host processor. The drive control of the display driver is performed by the host processor. For instance, the display driver has a register circuit; the host processor writes control data for drive control of the display panel into the register circuit, whereby the drive mode of the display driver driving the display panel is controlled. In this way, the control of the touch panel controller and the display driver are primarily performed by the host processor from outside.

The inventor found it inefficient to control the touch panel controller and the display driver from outside by use of only the host processor. In most cases, an input operation through a touch panel is of use on the assumption that the detection of a position by use of the touch panel is associated with the display on the display panel. In terms of the reduction in power consumption and the reliability of the detecting action, it is best to control the touch panel controller and the display driver which are associated with each other, and it is inefficient to put an external part or member in charge of the control of the touch panel controller and the display driver. Thus, the reduction in the load to such external host processor is achieved insufficiently.

It is an object of the invention to allow the reduction in the load of controlling a touch panel controller and a display driver from outside and to solve the problem of the inefficiency of such control.

The above and other problems and novel features of the invention will be apparent from the description hereof and the accompanying drawings.

Of the embodiments herein disclosed, the representative embodiment will be briefly outlined below.

The semiconductor device has a touch panel controller, a processor, and a display driver. The display driver has a memory circuit which rewritably stores control data for drive control of a display panel from outside the semiconductor device. The processor controls the touch panel controller based on a command provided from outside the semiconductor device, and accesses control data in the memory circuit for controlling internal parts of the semiconductor device. With the aid of the arrangement like this, the processor is allowed to control a touch panel based on the read control data fit to the control by the display driver, and to control, by writing control data, the display panel fit for a control condition of the touch panel.

Of the embodiments herein disclosed, the representative embodiment brings about the effect as briefly described below.

The following become possible to lighten the control load to an external part or member having control of an touch panel controller and a display driver, and solve the problem of the inefficiency of such control.

DETAILED DESCRIPTION

1. Summary of the Embodiments

The embodiments herein disclosed will be outlined first. Here, the reference numerals and the like for reference to the drawings, which are accompanied with paired round brackets, only exemplify what the concepts of members components or parts referred to by the numerals and the like contain.

<[1] MPU Capable of Accessing Control Data in Display Driver>

The semiconductor device (1, 1*m*) has: a touch panel controller (20) operable to perform pulse-drive control of drive electrodes of a touch panel (3), and detection control of touch signals developed on detection electrodes capacitively coupling with the drive electrodes; a processor (10, 10*m*) operable to control the touch panel controller; and a display driver (30) operable to perform drive control of a display panel. The display driver has a memory circuit (301) in which control data for drive control of the display panel is rewritably stored from outside the semiconductor device. The processor controls, based on a command provided from outside the semiconductor device, the touch panel controller, and accesses control data of the memory circuit for controlling internal parts of the semiconductor device.

According to the arrangement like this, the processor can perform, on the touch panel, the control fit for control of the display driver based on read control data, and it allows, by writing control data, the control of the display panel fit for a control condition of the touch panel. Therefore, it becomes possible to lighten the control load to an external part or member having control of a touch panel controller and a display driver. In addition, autonomous control without involving an external part or member can be performed and therefore, no time lag is caused in the control and thus the problem of the inefficiency of such control can be solved.

<[2] MPU Diverts Control Data in the Display Driver for Control of the Touch Panel Controller>

In the semiconductor device as described in [1], the processor (10, 10*m*) controls the touch panel controller based on a command provided from outside the semiconductor device, and refers to control data of the memory circuit and uses the control data for action control of the touch panel controller.

The arrangement like this allows the processor to autonomously control, by referring to control data of the memory circuit, the action of the touch panel controller according to a control command when making reference. To execute the same control, the host processor connected outside the semiconductor device is not required to additionally issue a command for providing an instruction on an action to take to the touch panel controller. Therefore, the control load to the host processor connected outside the semiconductor device can be lightened, and no time lag is produced in the control, and the inefficiency of the control can be eliminated because autonomous control can be performed without using an external part.

<[3] MPU Control by Means of Writing Control Data into the Display Driver>

In the semiconductor device as described in [2], the processor (10*m*) writes control data into the memory circuit to control the display driver according to a predetermined type of control on the touch panel controller.

According to the arrangement like this, the processor is enabled to write, into the control data memory circuit, an instruction for controlling the display driver to be in a condition fit to the control for the touch panel controller. To execute the same control, the host processor connected outside the semiconductor device is not required to additionally write the same control data into the memory circuit of the display panel Therefore, the control load to the host processor connected outside the semiconductor device can be lightened, and no time lag is produced in the control, and the inefficiency of the control can be eliminated because autonomous control can be performed without using an external part.

<[4] Refer to Instruction Data of the Low-Power Consumption Mode>

In the semiconductor device as described in [2], the processor refers to, as the control data, instruction data of a low-power consumption mode. On condition that the instruction data specifies a low-power consumption mode of the display panel, the processor brings the touch panel controller into the low-power consumption mode.

According to the arrangement like this, on condition that the display controller is instructed of the low-power consumption mode from outside, the semiconductor device autonomously puts the touch panel controller in the low-power consumption mode. Thus, the reduction in power consumption in the whole semiconductor device can be promoted autonomously.

<[5] Mode which Lowers the Frequencies of the Pulse-Drive Control and the Touch Signal Detection Control>

In the semiconductor device as described in [4], the low-power consumption mode is a mode which lowers the frequencies of the pulse-drive control and the touch signal detection control by the touch panel controller.

According to the arrangement like this, the power consumption by the touch panel controller can be reduced by decreasing the frequencies of the pulse-drive control and the touch signal detection control.

<[6] Refer to Instruction Data, Display Enable/Disable>

In the semiconductor device as described in [2], the processor refers to instruction data of Display enable/disable as the control data, and the processor stops driving the touch panel controller on condition that the instruction data specifies Display disable of the display panel.

According to the arrangement like this, on condition that the display controller is instructed of no display from outside, the semiconductor device autonomously instructs the touch panel controller of stop of driving. Thus, the reduction in power consumption in the whole semiconductor device can be promoted autonomously.

<[7] Refer to Instruction Data of a Drive Direction>

In the semiconductor device as described in [2], the processor refers to, as the control data, an instruction data which specifies a select direction of drive-scan lines of the display panel. The processor controls the select direction of the drive electrodes, in the same direction as the select direction of the drive-scan lines represented by the instruction data.

According to the arrangement like this, the potential of the drive electrode is strongly influenced by the change of potential of the drive-scan line on condition that the selected drive-scan line and the selected drive electrode are coincident, in position, with each other. Therefore, the semiconductor device is useful in preventing the occurrence of an event which worsens the accuracy of touch detection.

<[8] Write of Control Data that Specifies the Low-Power Consumption Mode>

In the semiconductor device as described in [3], on condition that the processor does not receive a result of judgment "being touched" for a predetermined period in the judgment performed based on detection signals from the touch panel controller, the processor instructs the touch panel controller of the low-power consumption mode, and writes, into the memory circuit, control data specifying the low-power consumption mode of the display driver.

According to the arrangement like this, the semiconductor device is autonomously instruct the display driver of the low-power consumption mode when controlling the touch panel controller to stay in the low-power consumption mode during a no-touch detection period. Thus, the reduction in power consumption in the whole semiconductor device can be promoted autonomously.

<[9] Instruction Data Representing the Condition of Generating a Boosted Voltage>

In the semiconductor device as described in [8], the low-power consumption mode of the display driver is an action mode including: making longer a voltage-boosting action cycle of a step-up circuit operable to produce a high voltage used for display control; or stopping a voltage-boosting action.

According to the arrangement like this, the power consumption in the display controller can be reduced by making longer a voltage-boosting action cycle of a step-up circuit operable to produce a high voltage used for display control; or stopping a voltage-boosting action.

<[10] MPU Writes Control Data Depending on Touch Panel Controller's Condition into the Display Driver>

The semiconductor device (1m) includes a touch panel controller (20) operable to perform pulse-drive control of a plurality of drive electrodes of a touch panel, and detection control of touch signals arising on a plurality of detection electrodes capacitively coupling with the drive electrodes; a processor (10m) operable to control the touch panel controller; and a display driver (30) operable to perform drive control of a display panel. In the semiconductor device, the display driver has a memory circuit (301) operable to rewritably store control data for drive control of the display panel from outside the semiconductor device. The processor (10m) controls the touch panel controller based on a command provided from outside the semiconductor device, and writes control data into the memory circuit according to a predetermined type of control on the touch panel controller, thereby controlling the display driver.

According to the arrangement like this, the processor is enabled to write, into the control data memory circuit, an instruction for controlling the display driver to be in a condition fit to the control for the touch panel controller. To execute the same control, the host processor connected outside the semiconductor device is not required to additionally write the same control data into the memory circuit of the display panel. Therefore, the control load to the host processor connected outside the semiconductor device can be lightened, and no time lag is produced in the control, and the inefficiency of the control can be eliminated because autonomous control can be performed without using an external part.

<[11] MPU Diverts Control Data in the Display Driver for Control of the Touch Panel Controller>

The electronic device (PDA, PDAm) includes: a host processor (2); a touch panel (3) having a plurality of drive electrodes, a plurality of detection electrodes, and a plurality of capacitance components formed at intersections of the drive and detection electrodes; a touch panel controller (20) operable to perform a pulse-drive control of the drive electrodes of the touch panel, and detection control of touch signals arising on the detection electrodes capacitively coupling with the drive electrodes; a processor (10, 10m) connected with the host processor, and operable to control the touch panel controller; a display panel (4); and a display driver (30) connected with the host processor, and operable to perform drive control of the display panel. The display driver has a memory circuit (301) in which control data to perform drive control of the display panel from the host processor is rewritably stored. The processor controls the touch panel controller based on a command provided from the host processor, and refers to control data in the memory circuit to use the data for action control of the touch panel controller.

The arrangement like this allows the processor to autonomously control, by referring to control data of the memory circuit, the action of the touch panel controller according to a control command when making reference. To execute the same control, the host processor is not required to additionally issue a command for providing an instruction on an action to take to the touch panel controller. Therefore, the control load to the host processor can be lightened, and no time lag is produced in the control, and the inefficiency of the control can be eliminated because autonomous control can be performed without using an external part.

<[12] MPU Controls by Means of Writing Control Data into the Display Driver>

In the electronic device as described in [11], the processor (10m) writes control data into the memory circuit to control the display driver according to a predetermined type of control on the touch panel controller.

According to the arrangement like this, the processor is enabled to write, into the control data memory circuit, an instruction for controlling the display driver to be in a condition fit to the control for the touch panel controller. To execute the same control, the host processor is not required to additionally write the same control data into the memory circuit of the display panel. Therefore, the control load to the host processor can be lightened, and no time lag is produced in the control, and the inefficiency of the control can be eliminated because autonomous control can be performed without using an external part.

<[13] MPU Writes Control Data Depending on Touch Panel Controller's Condition into the Display Driver>

The electronic device (PDAm) includes: a host processor (2); a touch panel having a plurality of drive electrodes, a plurality of detection electrodes, and a plurality of capacitance components formed at intersections of the drive and detection electrodes; a touch panel controller (20) operable to perform pulse-drive control on drive electrodes of a touch panel, and detection control of touch signals arising on detection electrodes capacitively coupling with the drive electrodes; a processor (10m) connected with the host processor, and operable to control the touch panel controller; a display panel (4); and a display driver (30) connected with the host processor, and operable to perform drive control of the display panel. The display driver has a memory circuit (301) in which control data to perform drive control of the display panel from the host processor is rewritably stored. The processor controls the touch panel controller based on a command provided from the host processor, and controls the display driver by writing control data into the memory circuit according to a predetermined type of control on the touch panel controller.

According to the arrangement like this, the processor is enabled to write, into the control data memory circuit, an instruction for controlling the display driver to be in a condition fit to the control for the touch panel controller. To execute the same control, the host processor is not required to additionally write the same control data into the memory circuit of the display panel. Therefore, the control load to the host processor can be lightened, and no time lag is produced in the control, and the inefficiency of the control can be eliminated because autonomous control can be performed without using an external part.

2. Further Detailed Description of the Embodiments

The embodiments will be described further in detail.

Figure 1:
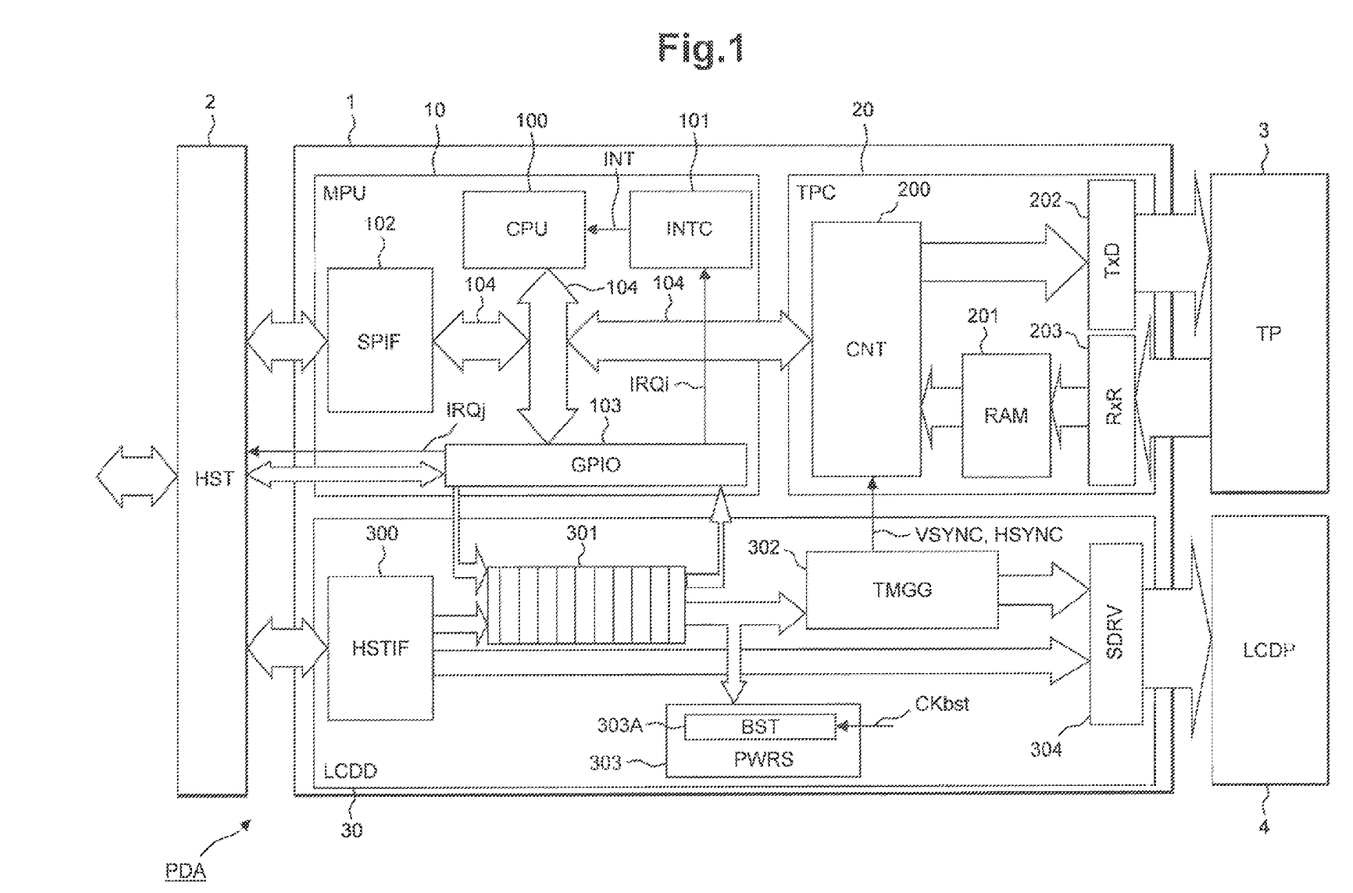
FIG. 1 is a block diagram showing, by example, a portable terminal to which the first embodiment of the semiconductor device according to the invention is applied.

FIG. 1 shows, by example, a portable terminal to which the first embodiment of the semiconductor device according to the invention is applied. The portable information terminal PDA shown in the drawing is one embodiment of the electronic device according to the invention, and forms e.g. a smart phone or a mobile phone, which includes a controller driver 1 which is one embodiment of the semiconductor device, a touch panel (TP) 3, a liquid crystal panel (DLCP) 4 which is one embodiment of the display panel, a host processor (HST) 2, and a communication device and a peripheral device, both connected with the host processor 2, and not shown in the drawing.

The controller device 1 includes a touch panel controller (TPC) 20; a liquid crystal driver (LCDD) 30 which is one embodiment of the display driver; and a subprocessor (MPU) 10. For instance, the controller device is formed in a substrate of semiconductor such as single crystal silicon by a CMOS integrated circuit manufacturing technique. Also, the controller device 1 can be materialized as a device which is modularized by forming a multichip in one package.

The detail of the touch panel 3 is not shown in the drawing particularly, but a mutual capacitance type touch panel which enables a multi-touch detection is taken as one embodiment of the touch panel here. The touch panel 3 has a plurality of drive electrodes (Y-electrodes), a plurality of detection electrodes (X-electrodes), and a plurality of intersections formed by the drive and detection electrodes. The intersections each form a capacitance component. The touch panel controller 20 controls the pulse driving of the drive electrodes of the touch panel 3, and controls the detection of touch signals arising on the detection electrodes capacitively coupling with the drive electrodes. Specifically, the touch panel controller sequentially supplies the drive electrodes with a drive pulse, sequentially takes resultant signals from the detection electrodes, and then integrates the signals to obtain detection data corresponding a variation in the capacitance component at each intersection. The subprocessor 10 is a microprocessor for a subsystem, which has control of the touch panel controller 20, and calculates a touch position coordinate based on touch detection signals from the touch panel 3. Specifically, the subprocessor performs a digital filtering calculation on detection data acquired by the touch panel controller 20 to remove noise therefrom. Based on the resultant data with noise removed therefrom, the subprocessor calculates a position coordinate of the intersection with a fluctuation of capacitance caused thereon. That is, the subprocessor calculates a position coordinate at the time of occurrence of an event of touch in order to indicate which intersection a stray capacitance has been changed namely which intersection a finger has approached or touched, or which intersection an event of touch has occurred on.

The touch panel 3 includes a transmissive (i.e. translucent) electrode and a dielectric film. The touch panel is arranged over the display face of the liquid crystal panel 4, for example. The forms of the combination of the touch panel 3 and the liquid crystal panel 4 are roughly classified into an external attachment form in which the touch panel prepared as a discrete part is externally attached to the liquid crystal panel; and an in-cell form in which the touch panel is incorporated in the liquid crystal panel. Any of these forms may be adopted.

The host processor 2 controls the portable information terminal PDA totally, and issues, to the controller device 1, a command for touch detection by the touch panel 3 and a display command for the liquid crystal panel 4. Also, the host processor receives data of touch-detection-position coordinates from the controller device 1, and analyzes an input resulting from an operation on the touch panel 3 from the relation between a touch detection position and a frame of display image.

While not particularly shown in the drawing, the details of the liquid crystal panel 4 will be described here. The liquid crystal panel has a plurality of gate electrodes and a plurality of drain electrodes which are arranged so as to form a matrix, and a plurality of TFT switches formed at intersections of the gate and drain electrodes respectively. Incidentally, TFT stands for "Thin Film Transistor". Each TFT switch is connected, on its source side, with a liquid crystal pixel electrode of the liquid crystal capacitance, forming a sub-pixel, and the opposite-side electrode of the liquid crystal capacitance is formed by a common electrode. The drain electrodes are supplied with e.g. RGB gradation voltages output by the liquid crystal driver, and the gate electrodes are supplied with a scan pulse e.g. in the order of the arrangement thereof.

The touch panel controller 20 has: a drive circuit (T×D) 202; a detection circuit (R×R) 203; a RAM 201; a drive-detection-control circuit (CNT) 200. The drive circuit 202 outputs a drive pulse to the drive electrodes according to a control signal from the drive-detection-control circuit 200. According to control signal from the drive-detection-control circuit 200, the detection circuit 203 integrates a fluctuation in potential arising, in synchronization with an edge change of a drive pulse, on each of the detection electrodes capacitively coupling with the drive electrodes over more than one change of the drive pulse, performs an analog-to-digital conversion on the resultant signals, and thus outputs the resultant detection data. The RAM 201 temporarily holds the detection data each time the action for the drive and detection is performed for the face of the touch panel 3 entirely (in unites of detection frames). The drive-detection-control circuit 200 controls the timing of the action on the drive circuit (T×D) 202 and the detection circuit (R×R) 203, and also controls the access to RAM 201.

While just representatively shown in the drawing, the processor 10 has a CPU (Central Processing Unit) 100, an interrupt controller (INTC) 101, a serial-parallel interface (SPIF) 102, as one example of an external interface, and a general-purpose input-output circuit (GPIO) 103, which are connected through an internal bus 104. The serial-parallel interface 102 receives a command for providing an instruction on the action of the touch panel from the host processor 2. By executing the command for providing an instruction on the action of the touch panel, CPU 100 causes the touch panel controller 20 to activate the touch panel, to take detection signals, to convert the detection signals into digital ones, and to acquire detection data in units of frames. The detection data obtained in units of frames are used in the coordinate calculation by CPU. The coordinate data of a touch position determined by the calculation is provided to the host processor 2. On the general-purpose input-output circuit 103, CPU 100 sets input and output functions are set. The general-purpose input-output circuit 103 is used to input/output particular information to/from the host processor 2 and the like. The interrupt controller 101 performs the control for outputting an interrupt signal INT to CPU 100 in response to an interrupt request signal IRQi, which is representatively shown in the drawing, and the control for notifying CPU 100 of a cause of the interruption. Incidentally, the general-purpose input-output circuit 103 outputs the interrupt request signal IRQj to the host processor 2 as a request for external interruption.

What action of the touch panel 3 is controlled by the touch panel controller 20 is primarily determined by a command provided to the subprocessor 10 by the processor 2. Examples of such command include a touch-detection command, a calculation command, and low-power-consumption command, and the action is defined in detail by a command parameter of each command. The touch-detection command is accompanied by command parameters which specify e.g. the direction of driving the drive electrodes, the number of pulses of the drive pulse to the drive electrodes, the frequency of the drive pulse, and the pulse width of the drive pulse. The low-power-consumption command is accompanied by an interval parameter for setting an interval of the detecting action to obtain a detection frame, a sleep parameter for setting a sleep mode, etc.

The liquid crystal driver 30 has: a host interface (HSTIF) 300; a register circuit 301; a timing generator (TMGG) 302; a power supply circuit (PWRS) 303 with a charge pump used therein; and a drive circuit (SDRV) 304 operable to supply the liquid crystal panel 4 with a drive voltage and gradation voltages. The host interface 300 is connected with the host processor 2, and receives control data for drive control of the liquid crystal panel 4 from the host processor 2; the received control data are stored in the register circuit 301 rewritably. Further, the host interface 300 accepts the input of display data from the host processor 2, and then provides the display data to the drive circuit 304. The timing generator 302 controls the order of driving the scan electrodes of the touch panel and the drive timing in the action mode according to the instruction of the control data, and controls the timing for supplying the display electrodes with gradation voltages depending on the display data in line with the drive timing of the scan electrodes. The power supply circuit has a step-up circuit (BST) 303A operable to perform a voltage-boosting action in synchronization with a boost-clock signal CKbst, and supplies a boosted gradation voltage and a boosted scan drive voltage to the drive circuit 304, etc. The step-up circuit 303A is instructed on the enable/disable of the liquid crystal driver, the frequency of the boost-clock signal and the like by means of control data of the register circuit 301. As described above, the action control of the liquid crystal panel 4 by the liquid crystal driver 30 is primarily determined by the control data written in the register circuit 301 by the host processor 2.

Figure 2:
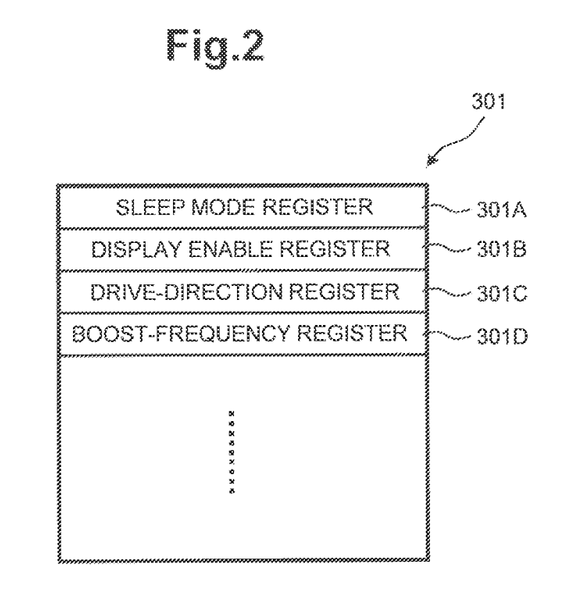
FIG. 2 is an explanatory diagram showing, by example, control data held by a register circuit of liquid crystal driver.

FIG. 2 shows, by example, a specific embodiment of e.g. the register circuit 301. While not particularly limited, the register circuit 301 includes a sleep-mode register 301A, a display enable register 301B, a drive-direction register 301C, and a boost-frequency register 301D. On the sleep-mode register 301A, control data (liquid crystal driver sleep mode control data) specifying the sleep mode of the liquid crystal driver is set as one of instruction data of the low-power consumption mode. After the setting of the liquid crystal driver sleep mode control data, the timing generator 302 continues a sleep display until the sleep mode is cancelled. On the display enable register 301B, instruction data (display enable/disable control data) of Display Enable/Disable is set. After the setting of Display Disable is set, the display action is stopped to control the liquid crystal panel 4 to be in Non-display state until it inverted into Display Enable. On the drive-direction register 301C, instruction data (drive-scan-line-select direction control data) specifying the direction of selecting, from scan lines of the display panel 4, a drive-scan line is set. The drive-scan-line-select direction is determined according to the instruction data, which is made the direction from the top side of the liquid crystal panel 4 to the bottom side, or the direction from the bottom side to the top side. On the boost-frequency register 301D, instruction data (boosted clock-falling control data) lowering the boosted clock CKbst is set as another kind of instruction data of the low-power consumption mode. The frequency of the boosted clock CKbst is lowered to a frequency of the standby condition by activation of the control data.

As described above, the controller driver 1 is primarily controlled by the issue of a command by host processor 2 to the subprocessor 10, and the write of control data into the liquid crystal driver 30 by the host processor 2. Further, the controller driver 1 is arranged so that the subprocessor 10 can access control data of the register circuit 301 through the general-purpose input-output circuit 103. Here, the modes of the access include both the write of control data from the general-purpose input-output circuit 103 into the register circuit 301, and the read of control data from the register circuit 301 by the general-purpose input-output circuit 103.

Thanks to the addition of the function of the subprocessor 10 referring to the register circuit 301 for control data, the subprocessor 10 can control the touch panel controller 3 according to a command provided by the host processor 2, and can refer to control data of the register circuit 301 to use the data for controlling the action of the touch panel controller 3.

(1) In the form in which the subprocessor 10 refers to and uses the control data, e.g. the subprocessor performs the following control.

In the first example such form, the subprocessor 10 refers to, as control data, sleep mode control data in the sleep-mode register 301A, which is instruction data of the low-power consumption mode. If the sleep mode control data referred to is activated specifying the sleep mode of the liquid crystal driver 30, the subprocessor brings the touch panel controller 20 into the low-power consumption mode, and e.g. CPU 100 provides the drive-detection-control circuit 200 with an instruction for decreasing the frequencies of the pulse-drive control and detection control of touch signals by use of the touch panel controller 20.

According to the arrangement like this, when the host processor 2 instructs the liquid crystal driver 30 to stay in the low-power consumption mode such as the sleep mode, the controller driver 1 autonomously brings the touch panel controller 20 into the low-power consumption mode. In this way, the reduction in the power consumption can be autonomously promoted in the whole controller driver 1.

In the second example, the subprocessor 10 refers to display enable/disable control data in the display enable register 301B. If the control data specifies Display disable of the display panel 4, the subprocessor stops the touch panel controller 20 from driving the touch panel 3. This control can be materialized when CPU 100 instructs the drive-detection-control circuit 200 to stop the action for the drive and detection by the touch panel 3, for example.

According to the arrangement like this, when the host processor 2 instructs the liquid crystal driver 30 to put the liquid crystal panel 4 in Non-display state, the controller driver 1 autonomously makes the touch panel controller 20 instruct the touch panel 3 to stop the touch detection and driving. In this way, the reduction in the power consumption can be autonomously promoted in the whole controller driver 1.

In the third example, CPU 100 of the subprocessor 10 refers to drive-scan-line-select direction control data in the drive-direction register 301C, and has the touch panel controller 20 control the direction of selecting the drive electrode of the touch panel 3 so as to agree with the direction of selecting a drive-scan line of the liquid crystal panel 4, which is specified by the drive-scan-line-select direction control data referred to. This control can be materialized when CPU 100 provides the drive-detection-control circuit 200 with control data specifying the direction of selecting the drive electrode, for example.

According to the arrangement like this, the potential of the drive electrode of the touch panel 3 is strongly influenced by the change of potential of the drive-scan line on condition that the selected drive-scan line and the selected drive electrode are coincident, in position, with each other. Therefore, the controller driver 1 is useful in preventing the occurrence of an event which worsens the accuracy of touch detection.

As described on the first to third examples, the subprocessor 10 can autonomously control the action of the touch panel controller 20 according to the control data referred to by reference to control data of the register circuit 301. To execute the same control, the host processor 2 connected outside the controller driver 1 is not required to additionally issue a command for providing an instruction on an action to take to the touch panel controller 20. Therefore, the control load to the host processor 2 having control of the controller driver 1, etc. can be lightened, and no time lag is produced in the control, and the inefficiency of the control can be eliminated because the controller driver 1 can be controlled autonomously.

(2) Thanks to the addition of the function of the subprocessor 10 writing control data into the register circuit 301, the subprocessor 10 can write control data into the register circuit 301 to control the display driver 30 according to a predetermined type of control on the touch panel controller 3.

In the form in which the subprocessor 10 writes control data into the register circuit according to the control on the touch panel controller 20 to control the liquid crystal driver, the subprocessor performs the control in the way as follows.

For instance, on condition that the judgment is made based on detection signals from the touch panel controller 3 and consequently, the subprocessor 10 does not receive the result "being touched" for a predetermined period, the subprocessor performs the control to reduce the power consumption by the step-up circuit by: instructing the touch panel controller 3 to transition to the low-power consumption mode; writing boosted clock-falling control data into e.g. the boost-frequency register 301D of the register circuit 301 for the low-power consumption mode of the display driver 30; and lowering the boosted voltage provided by the step-up circuit 303A to a current-supply capacity in the standby condition.

According to the arrangement like this, the controller driver 1 can autonomously instruct the liquid crystal driver 30 of the low-power consumption mode when controlling the touch panel controller 20 to stay in the low-power consumption mode during a no-touch detection period. Thus, the reduction in power consumption in the whole controller driver 1 can be promoted autonomously.

As described above, the subprocessor 10 is enabled to write, into the register circuit 301, control data which provides an instruction for controlling the liquid crystal driver 30 to be in a condition fit to the control for the touch panel controller 20. To execute the same control, the host processor 2 operable to control the controller driver 1 is not required to additionally write the same control data into the register circuit 301 of the display panel 3. Therefore, the control load to the host processor 2 having control of the controller driver 1 can be lightened, and no time lag is produced in the control, and the inefficiency of the control can be eliminated because autonomous control can be performed without using the host processor 2.

Figure 3:
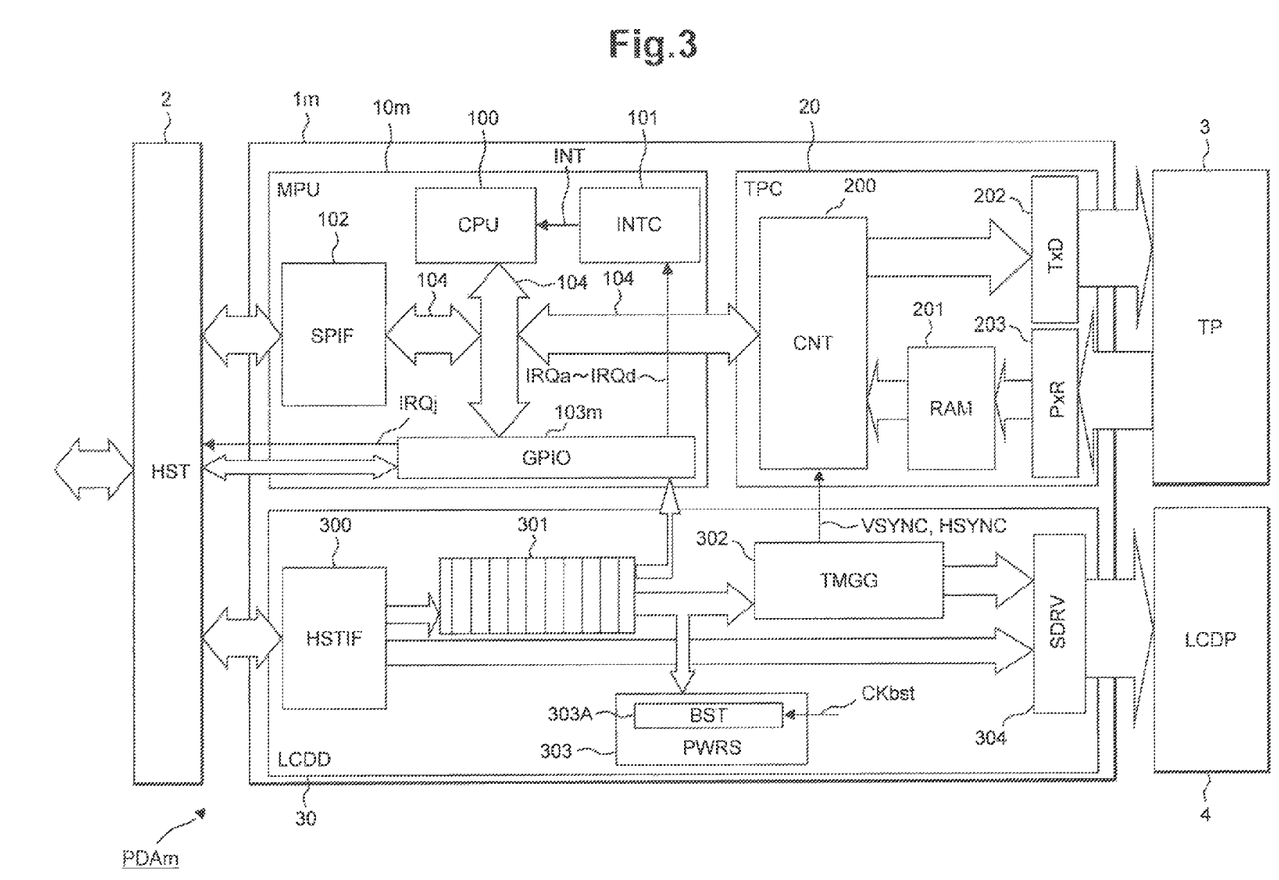
FIG. 3 is a block diagram showing, by example, a portable terminal to which the second embodiment of the semiconductor device according to the invention is applied.

FIG. 3 shows, by example, a portable terminal to which the second embodiment of the semiconductor device according to the invention is applied. The portable information terminal PDAm shown in the drawing is another embodiment of the electronic device according to the invention. The portable information terminal PDAm is different from the portable information terminal PDAm of FIG. 1 in that the subprocessor 10 refers to the register circuit 301, and a path for write into the register circuit 301 is not set on the general-purpose input-output circuit 103. Further, the way the subprocessor 10 refers to the register circuit 301 as described with reference to FIG. 1 is termed "polling method", in which CPU 100 regularly refers to the predetermined registers 301A to 301D, etc. according to its working program, whereas in the case of FIG. 3, the general-purpose input-output circuit 103*m* is arranged so as to output an interrupt request signal IRQa to IRQd which is changed on an individual register basis because the registers 301A to 301D are overwritten. The interrupt controller 101 outputs, to CPU 100, an interrupt signal INT and a cause of the interruption on condition that any one of the interrupt request signals IRQa to IRQd is activated. Then, CPU 100 refers to, of the registers 301A to 301D, a register corresponding to the cause of the interruption. Therefore, unlike the polling method as described with reference to FIG. 1, in this interruption method, even when a change in setting is made on any of the registers 301A to 301D, CPU can refer to the content of the registers immediately, and the responsiveness to control can be enhanced.

Other parts or members are the same as those of the portable information terminal of FIG. 1 and as such, the detailed descriptions thereof will be skipped here.

The invention is not limited to the above embodiments. It is obvious that various changes and modifications may be made without departing the subject matter thereof.

For instance, the polling method and the interruption method can be appropriately selected for the means for referring to the register circuit. The interruption method may be adopted for e.g. the portable information terminal of FIG. 1.

The low-power consumption mode of the liquid crystal driver is not limited to the case of lowering the frequency of a boosted clock, and it may be an action mode in which a voltage-boosting action is stopped.

The form of controlling a touch panel in which CPU uses a result of reference to the register circuit 301, and the form of controlling a liquid crystal driver in which control data is written into a register circuit according to the form of controlling a touch panel by CPU to provide an instruction are both not limited to the above embodiments, and they can be changed appropriately.

The liquid crystal driver may be of a type just having the function of driving scan electrodes. In that case, another circuit may have the function of outputting gradation voltages.

The display panel is not particularly limited to a liquid crystal panel. It may be a display panel of another display format, such as an EL (Electro-Luminescence) panel.

What is claimed is:

1. A semiconductor device comprising:
a touch panel controller operable to perform pulse-drive control of drive electrodes of a touch panel, and detection control of touch signals arising on detection electrodes capacitively coupled with the drive electrodes;
a processor operable to control the touch panel controller; and
a display driver operable to perform drive control of a display panel;
wherein the display driver has a memory circuit operable to rewritably store display control data for drive control of the display panel from outside the semiconductor device,
wherein the processor controls the touch panel controller based on a command provided from outside the semiconductor device,
wherein the processor controls the touch panel controller based on a command provided from outside the semiconductor device, and obtains the display control data of the memory circuit and uses the display control data for action control of the touch panel controller,
wherein the processor obtains, as the display control data, instruction data written into a register which specifies a select direction of drive-scan lines of the display panel, and
wherein the processor controls a select direction of the drive electrodes to be in a same direction as the select direction of the drive-scan lines as represented by the instruction data.

2. The semiconductor device according to claim 1, wherein the processor obtains, as the display control data, instruction data of a low-power consumption mode,
on condition that the instruction data specifies a low-power consumption mode of the display panel, the processor brings the touch panel controller into the low-power consumption mode.

3. The semiconductor device according to claim 2, wherein the low-power consumption mode is a mode which lowers the frequencies of the touch signal detection control by the touch panel controller.

4. The semiconductor device according to claim 1, wherein the processor obtains instruction data of display enable/disable as the display control data, and
on condition that the instruction data specifies display disable of the display panel, the processor stops driving the touch panel controller.

5. The semiconductor device according to claim 1, wherein on condition that the processor does not receive a result of judgment "being touched" for a predetermined period in the judgment performed based on detection signals from the touch panel controller, the processor instructs the touch panel controller of a low-power consumption mode, and writes, into the memory circuit, the display control data specifying the low-power consumption mode of the display driver.

6. The semiconductor device according to claim 5, wherein the low-power consumption mode of the display driver is an action mode including: making longer a voltage-boosting action cycle of a step-up circuit operable to produce a high voltage used for display control; or stopping a voltage-boosting action.

7. The semiconductor device according to claim 1, wherein the processor writes the display control data into the memory circuit to control the display driver according to a predetermined type of control of the touch panel controller.

8. A semiconductor device comprising:
a touch panel controller operable to perform pulse-drive control of drive electrodes of a touch panel, and detection control of touch signals arising on detection electrodes capacitively coupled with the drive electrodes;
a processor operable to control the touch panel controller; and
a display driver operable to perform drive control of a display panel,
wherein the display driver has a memory circuit operable to rewritably store display control data for drive control of the display panel from outside the semiconductor device,
wherein the processor controls the touch panel controller based on a command provided from outside the semiconductor device, and writes the display control data into the memory circuit according to a predetermined type of control for the touch panel controller, thereby controlling the display driver,
wherein the processor obtains, as the display control data, instruction data written into a register which specifies a select direction of drive-scan lines of the display panel, and
wherein the processor controls a select direction of the drive electrodes to be in a same direction as the select direction of the drive-scan lines as represented by the instruction data.

9. An electronic device comprising:
a host processor;
a touch panel having a plurality of drive electrodes, a plurality of detection electrodes, and a plurality of capacitance components formed at intersections of the drive and detection electrodes;
a touch panel controller operable to perform a pulse-drive control of the drive electrodes of the touch panel, and detection control of touch signals arising on the detection electrodes capacitively coupled with the drive electrodes;
a processor connected with the host processor, and operable to control the touch panel controller;
a display panel; and
a display driver connected with the host processor, and operable to perform drive control of the display panel,
wherein the display driver has a memory circuit in which display control data to perform drive control of the display panel from the host processor is rewritably stored,
wherein the processor controls the touch panel controller based on a command provided from the host processor, and obtains the display control data in the memory circuit and uses the data for action control of the touch panel controller,
wherein the processor writes the display control data into the memory circuit to control the display driver according to a predetermined type of control for the touch panel controller,
wherein the processor obtains, as the display control data, instruction data written into a register which specifies a select direction of drive-scan lines of the display panel, and
wherein the processor controls a select direction of the drive electrodes to be in a same direction as the select direction of the drive-scan lines as represented by the instruction data.

* * * * *